Oct. 13, 1936.  L. B. MARCY ET AL  2,057,440
METHOD OF MAKING SEAMLESS HOLLOW HANDLES FOR CUTLERY AND THE LIKE
Filed March 21, 1933

Fig. 5a

INVENTORS
Lyle B. Marcy
BY Birger Egeberg
Bartlett, Eyre, Scott & Keel
ATTORNEYS Patented Oct. 13, 1936

2,057,440

UNITED STATES PATENT OFFICE 2,057,440

METHOD OF MAKING SEAMLESS HOLLOW HANDLES FOR CUTLERY AND THE LIKE

Lyle B. Marcy and Birger Egeberg, Meriden, Conn., assignors to International Silver Company, Meriden, Conn., a corporation of New Jersey Application March 21, 1933, Serial No. 661,912

10 Claims. (Cl. 76—106)

This invention relates to the art of making seamless hollow handles for table knives, cutlery and the like.

One object of the invention is a novel and improved method of making the hollow handles out of a suitable metal, such for example as nickel silver.

It has heretofore been proposed to form hollow handles by utilizing a tubular blank form, filling the blank with a readily meltable material to give rigidity to the tubular blank and then shaping the same by the application of mechanical pressure to the tubular blank. One object of the invention is the utilization of a special alloy filler which is not only easily melted for introduction into and removal from the hollow tubular blanks, but also has to a marked degree the desired plastic and resistive qualities as a filler for the blank tubes. A further object is the utilization of a filler which upon solidification does not contract to any extent or which may slightly expand, thereby assuring the complete filling of the hollow blank, these requirements being fulfilled by the special alloy. A further object of the invention is a novel method of introducing this alloy into the tubular blanks which method more particularly comprises the step of introducing the melted alloy into the tubular blanks under the surface of a liquid such for example as water which is raised to a temperature above that of the melting point of the alloy, the advantages of which will hereinafter appear.

Other objects will hereinafter appear.

Figure 6:
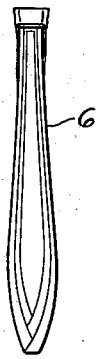
Figure 7:
Figure 8:
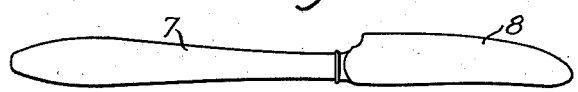

For a better understanding of the invention reference may be had to the accompanying drawing illustrating in somewhat diagrammatic manner the invention in which Figs. 1 to 7 inclusive illustrate steps in the manufacture of the hollow handle; and Fig. 8 is a view of a completed article.

Referring to the drawing the invention has to do with the production of the hollow handles for cutlery, knives and the like, such for example as the handle 7 of the knife shown in Fig. 8.

Figure 1:
Figure 2:
Figure 3:

The steps in the method of manufacture are illustrated in Figs. 1 to 7 inclusive. A nickel silver tubular blank 1 of suitable diameter and length, closed at one end, forms the basic handle piece to work on. It may be formed according to any standard or suitable drawing process. Figs. 2 and 3 indicate two further steps in the formation of the handle, Fig. 2 showing the tubular blank slightly tapered at 2 at the closed end and Fig. 3 showing the same blank tapered to reduce the size of the tube to a size somewhat larger than the finished handle at the open or smaller end 3. The operations of Figs. 2 and 3 may be performed according to any standard swaging or metal working practice and the object, as indicated, is to cause the tubular blank to conform generally to the contour of the finished handle prior to the following steps. The blank thus produced, as shown in Fig. 3, is then filled with a suitable substance or material which, while being suitably hard or relatively hard, has a certain degree of compressibility and plasticity and yet will offer the required resistance to insure accurate final shaping, and ornamentation, if desired, of the handle.

The preferred filling substance or material is a metallic alloy having a low melting point whose specific gravity is greater than that of water, and the filling of the tubular blank 3 is effected under the surface of a hot liquid, such as water, the material or substance not floating or rising when immersed in water and, of course, the alloy must not be soluble in water. While the invention is not confined or restricted to any specific alloy, so long as it has the necessary characteristics and properties desired, it has been found that an alloy having in general the following constituents is particularly suitable for carrying out the invention: lead 26.0%, tin 14.8%, bismuth 52.2% and cadmium 7.0%. This alloy will melt at a temperature lower than that of boiling water, its melting point being approximately 155 degrees Fahrenheit. It has a Brinell hardness of 30 at 70 degrees Fahrenheit (500 kg. load and 10 m/m diameter ball). It has the combination of correct compressibility and plasticity and offers the suitable resistance necessary to perform the final shaping, swaging and ornamenting operations. The alloy specified has the property of only a slight change in volume during solidification. This is an important property since it insures the tube or shell being in a completely filled state or condition when the alloy sets upon cooling and the objectionable shrinking on cooling of certain fillers heretofore proposed, which due to the contraction leaves voids or spaces between the filler and the walls of the shell or tube, is thereby obviated. The particular alloy disclosed having a large bismuth content has such a low melting point that it does not wet the inside surface of the hollow blank and, therefore, does not stick to it but is completely removed during the emptying step under the surface of the liquid, which prevents rattling handles and metal losses and produces a clean highly satisfactory article.

In filling the cylindrical tapered hollow piece of

Figure 4:
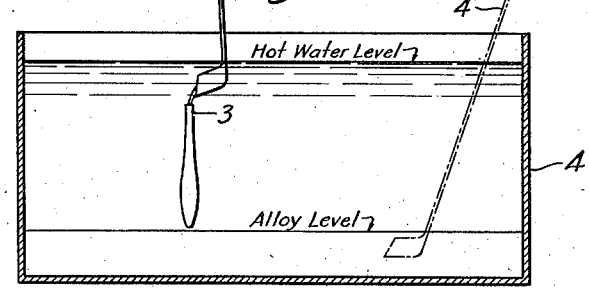

Fig. 3 the alloy is placed in a bath of liquid, as water, the liquid being heated to a temperature close to the boiling point, which is sufficient to reduce the alloy to a fluid state. The pieces 3 to be filled are immersed in the water and the fluid alloy poured into the blank handles or pieces when in this position. This step in the manufacture is illustrated in Fig. 4. A tank 4 containing the suitable melting liquid, as for example water, is provided and the material or substance, such for example as the alloy above described, is placed in this tank. The alloy is reduced to the fluid state by the hot water and sinks to the bottom of the tank. The tapered hollow blanks of Fig. 3 are immersed in the hot water with the open end 3 up and the liquid alloy is then ladled into these hollow blanks, a hand ladle being shown in the drawings at 4'. After filling, the tapered handles are then removed from the hot water and the alloy permitted to cool and harden whereupon the blank is then ready for the remaining forming, and stamping operations.

Figure 5:
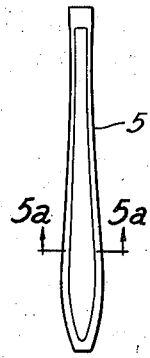

The next operation results in the shape indicated in Fig. 5. This operation results in forming or flattening the tapered tube to a shape conforming closely to the shape desired in the finished article and is a sizing operation performed in a heavy upsetter press by pressing between dies operating simultaneously in two planes. Fig. 5a is a sectional view showing the general shape of the blank working piece at one point. In the next operation the desired figure or ornamental effect is applied, such for example as the ornament shown in Fig. 6. This operation may be performed in a drop hammer, utilizing a pair of matched dies, provided with a shoulder or other arrangement to prevent extrusion of the filling material through the open end of the tube blank. The fin or flash 6 from the stamping operation indicated about midway on the thickness or side of the piece may be trimmed off now or in a subsequent operation, preferably in a subsequent operation. The pieces shown in Fig. 6 are then heated to cause the fusible alloy to melt and run out. This may conveniently be done by holding the pieces or blanks 6 of Fig. 6 with one end down in boiling water or other liquid sufficiently hot to melt the alloy whereupon the fused alloy readily runs out. For example, the tank 4 may be used for this purpose, the fusible alloy settling down to the bottom of the tank and being used over again. The handle is then subjected to a finishing operation. For example, it may then be placed in a trimming die, flash trimmed, and the open end of the handle trimmed in a squaring up trimming die and the finished handle is indicated in Fig. 7. The finished handle may then have the blade 8 assembled thereupon as indicated in Fig. 8.

As above stated, the particular filling alloy disclosed is desirable because it has the exact compressibility and plasticity desired, while still possessing the required resistance to deformation for enabling the desired forming and shaping of the hollow handle blanks, and it has practically no volume change characteristic upon solidifying. This alloy is oxidizable when in contact with the air, and oxidation would result in quickly forming a film of oxide or dross on the surface of the melting alloy if exposed to the air. This dross in a relatively short time would accumulate to quantities which would be very wasteful and also detrimental to the stamping operations performed after the shell is filled with the alloy. As the alloy melts in boiling water and settles to the bottom of the container holding the boiling water due to its greater specific gravity, contact with the air is prevented and no oxidation can take place. If the shells are filled with the alloy under the water surface and the alloy is later melted and poured from the shells under the water surface no contact of air with the alloy results.

As above indicated, while an alloy of specific constituents and proportions is specified, it is obvious that these proportions and constituents may be varied without departing from the spirit of the invention. The advantage of filling blank handles under the surface of hot or boiling water or other suitable liquid applies to the use of any desirable filling material or substance, but, as indicated above, it has particular application to the use of a substance or material which would be subject to air oxidation in a greater or lesser degree in its melted or fluid state and also to filling materials which tend to solidify quickly in open air.

Any suitable forming, sizing and stamping apparatus may be employed in the practice of the invention above set forth and it is deemed unnecessary to illustrate such apparatus.

We claim:

1. The method of manufacturing hollow metallic articles of the character set forth which comprises filling the same under the surface of a hot liquid with a fused material which when cold offers sufficient resistance to enable the metallic article to be subjected to metal working operations, and then subjecting the article to metal working operations and removing the fusible filling material.

2. The method of manufacture of hollow metallic articles of the character set forth which comprises filling the hollow article under the surface of hot water with a material which is fused at the temperature of the water and has a higher specific gravity than that of water, permitting the fused material to become hardened and then subjecting the article to metal working operations while the filling material is retained and then removing the fusible material.

3. The method as set forth in claim 1 wherein the filling material has the strength, plasticity, low melting point and lack of shrinkage and wetting of an alloy containing 26% lead, 14.8% tin, 52.2% bismuth and 7.0% cadmium.

4. The method as set forth in claim 1 wherein the filling material is a metallic alloy which will melt at a temperature lower than that of the hot liquid, is of a higher specific gravity than that of said liquid and is insoluble therein.

5. The method as set forth in claim 1 wherein the hollow articles are filled with a fused metallic material which is non-wetting and has substantially no negative co-efficient of expansion in the temperature range in which the alloy solidifies.

6. The method as set forth in claim 1 wherein the fusible filling material is remelted under the surface of a hot liquid and removed therein.

7. The method of manufacturing hollow metallic articles of the character set forth which comprises filling the same with a fused alloy having the strength, plasticity, low melting point and lack of wetting of an alloy containing 52.2% bismuth, 26% lead, 14.8% tin, and 7.0% cadmium, permitting the fused alloy to solidify and cool down to room temperature, then subjecting the article to metal working operations, after such solidification, and then removing the fusible alloy.

8. The method as set forth in claim 1 wherein the fused material is an alloy which contains a predominating proportion of bismuth and has a melting point below that at which the fused material would wet and stick to the surface of the hollow articles.

9. The method of shaping hollow metallic blanks of the character set forth, which comprises filling the same with a melted alloy containing bismuth aproximating in proportion half the alloy content and alloyed with other elements which reduce the melting point to a point below 212° F. and below that at which the melted alloy would wet and stick to the surface of the hollow blanks, and whose expansion characteristics combine with those of bismuth to obtain an alloy which upon solidification and cooling down to room temperature has substantially no volume change in the temperature range in which the alloy solidifies and cools down to room temperature, and when cold offers sufficient resistance and plasticity to enable the metallic blanks to be subjected to metal working operations, subjecting the blanks thus filled to metal working operations after such solidification, and then removing the fusible alloy.

10. The method of shaping hollow metallic blanks of the character set forth, which comprises filling the same with a melted alloy containing bismuth approximating in proportion half the alloy content and alloyed with other elements which reduce the melting point to a point below that at which the melted alloy would wet and stick to the surface of the hollow blanks and below the boiling point of water, whereby the alloy may be melted under the surface of boiling water, said bismuth content being alloyed with the other elements to obtain an alloy which when cold offers sufficient resistance and plasticity to enable the metallic blanks to be subjected to metal working operations, subjecting the blanks thus filled to metal working operations after filling the same and after the solidification of the alloy and then removing the fusible alloy from the blanks.

LYLE B. MARCY.
BIRGER EGEBERG.